United States Patent [19]
Takenoshita et al.

[11] 3,955,649
[45] May 11, 1976

[54] DEVICE FOR CORRECTING FLOOR LEVEL OF HYDRAULIC ELEVATOR

[75] Inventors: Mitsuaki Takenoshita, Katsuta; Ken Ichiryu, Mito; Ichiro Nakamura, Katsuta; Yukio Murakami, Katsuta; Hiroshi Yumino, Katsuta, all of Japan

[73] Assignee: Hitachi, Ltd., Japan

[22] Filed: Feb. 12, 1974

[21] Appl. No.: 441,899

[30] Foreign Application Priority Data
Feb. 16, 1973 Japan............................... 48-18261

[52] U.S. Cl.............................................. 187/29 A
[51] Int. Cl.²................................................ B66B 1/04
[58] Field of Search...................................... 187/29

[56] References Cited
UNITED STATES PATENTS

| | | | |
|---|---|---|---|
| 1,352,742 | 9/1920 | Furlow................... | 187/29 |
| 1,944,432 | 1/1934 | Hunter................... | 187/29 |
| 2,189,193 | 2/1940 | Brown.................... | 187/29 |
| 2,359,112 | 9/1944 | Hymans.................. | 187/29 |
| 3,187,844 | 6/1965 | MacNair et al.......... | 187/29 |

*Primary Examiner*—Robert K. Schaefer
*Assistant Examiner*—W. E. Duncanson, Jr.
*Attorney, Agent, or Firm*—Craig & Antonelli

[57] ABSTRACT

A floor level correcting device used in a hydraulic elevator comprises means for electrically detecting the vertical position of the elevator cage with respect to the floor landing and driving means for level correction, provided independent of a main power unit for driving the elevator cage. The detecting means comprises means provided in the elevator shaft and means provided in the elevator cage which detect, in cooperation with each other, the level of the cage with respect to the floor landing of the building in particular whether the cage is stopped in the proper landing position or shifted therefrom, so as to produce an electrical signal in accordance with the detected cage level to transmit the signal to the driving means for level correction. The driving means for level correction comprises an accumulator and an electromagnetic valve and the electromagnetic valve is actuated by the electric signal from the position detecting means, so that the hydraulic fluid in a cylinder forming a part of the driving mechanism of the elevator is withdrawn into a tank, or the hydraulic fluid in the accumulator is conducted into the cylinder to thereby correct the level of the cage.

12 Claims, 7 Drawing Figures

DEVICE FOR CORRECTING FLOOR LEVEL OF HYDRAULIC ELEVATOR

The present invention relates to a device for correcting the level of the cage floor of a hydraulic elevator relative to the proper landing floor.

The level difference between the cage floor of a hydraulic elevator and the landing floor of the building, i.e., the discrepancy of landing position, is caused mainly by the following phenomena: one due to the variation in the amount of the hydraulic fluid flowing through the flow control valve to control the landing floor level depending on the thermal change of the characteristic of fluid and the variation accompanying the change in load, and the other due to the volume change, i.e., the compression or expansion, of the hydraulic fluid accompanying the variation in load after the elevator is stopped in place, that is, the variation in load caused according as the passengers get on or off the cage after the cage is stopped at the proper level.

In order to decrease the landing difference due to the former phenomenon and to improve the landing accuracy, the conventional elevator is operated at two speeds, i.e. full speed and landing (or low) speed, and by detecting the actual landing speed the landing speed and the time of operation at the landing speed are controlled. However, this system for operating the elevator has a drawback that the structure is complicated and the cost is considerable. In order to correct the landing difference due to the latter phenomenon, the movement of the cage is transmitted through the clutch to the rope and the valve to control the hydraulic fluid to and from the cylinder is operated by the rope according as the cage ascends or descends with respect to the proper landing floor. In this case, however, the valve and the rest must be provided in the elevator shaft so that a nuisance is incurred in installation and maintenance.

It is, therefore, one object of the present invention to provide a device for correcting the landing level of a hydraulic elevator, which has a simple structure and can correct the landing differences due to the above-mentioned phenomena.

Another object of the present invention is to provide a device for correcting the landing level of a hydraulic elevator, which has a high reliability with little noise.

An additional object of the present invention is to provide a device for correcting the landing level of a hydraulic elevator, which can correct the landing difference rapidly.

According to one of the features of the present invention, in case where the elevator cage stops at a wrong landing level or in case where the cage is shifted slightly away from the proper landing level after its correct landing, the landing level difference is electrically detected without noises and as a result of this an electric signal is produced. The electric signal is then transmitted to the driving source using the accumulator containing hydraulic fluid whose pressure is higher than that of the hydraulic fluid contained in the cylinder, so that the level difference of the cage may be corrected.

Other objects, features and advantages of the present invention will be apparent when one reads the following detailed description of the invention with the aid of the attached drawings, in which.

Figure 1:
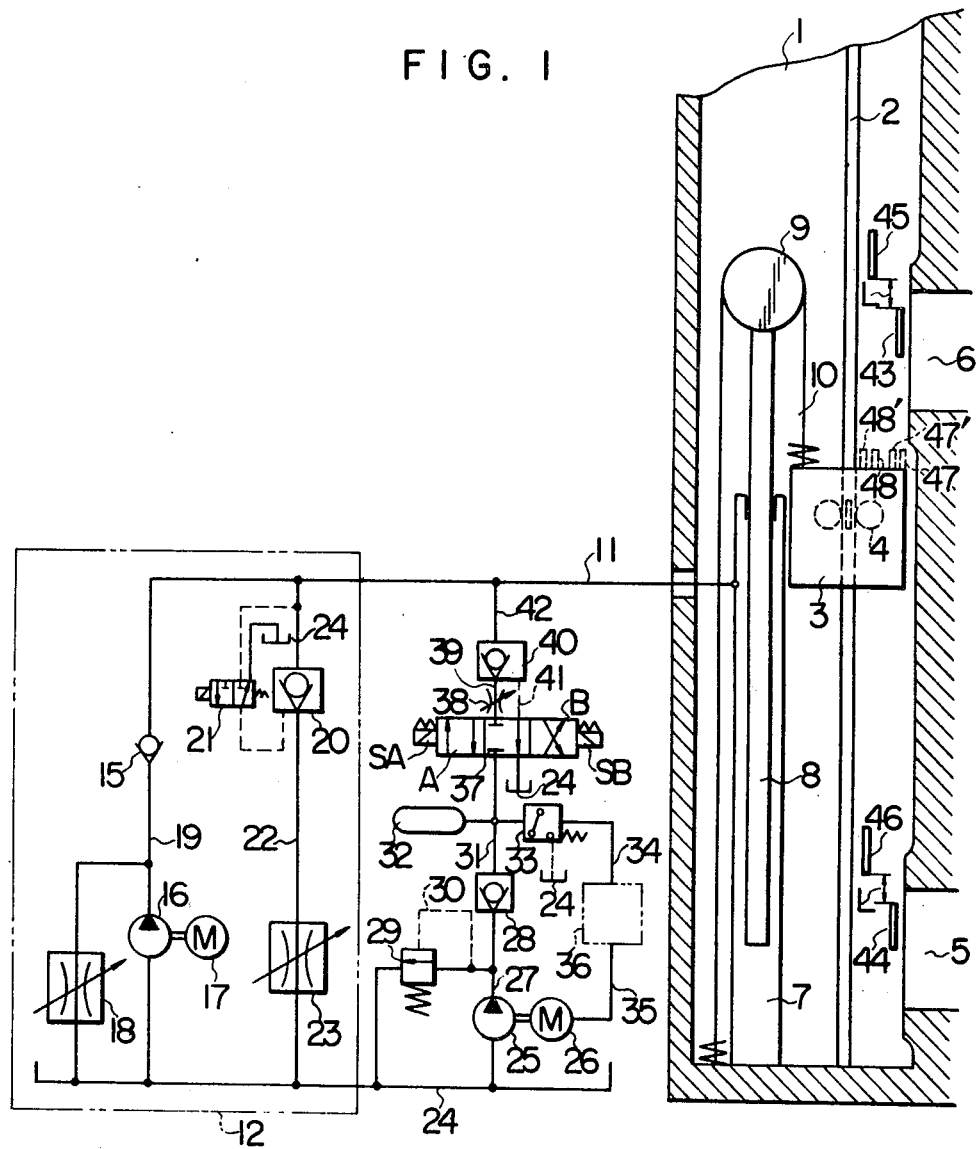
FIG. 1 is a block diagram showing the piping for a hydraulic elevator provided with a device, according to an embodiment of the present invention, for correcting the landing level of the elevator and the disposition of the device.
Figure 2A:
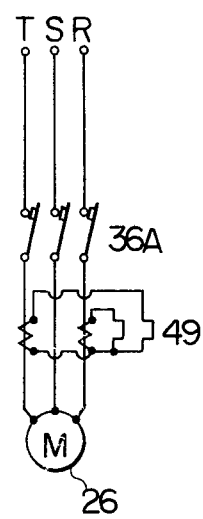
FIG. 2a is an electrical circuit diagram of a power source for an auxiliary motor.
Figure 2B:
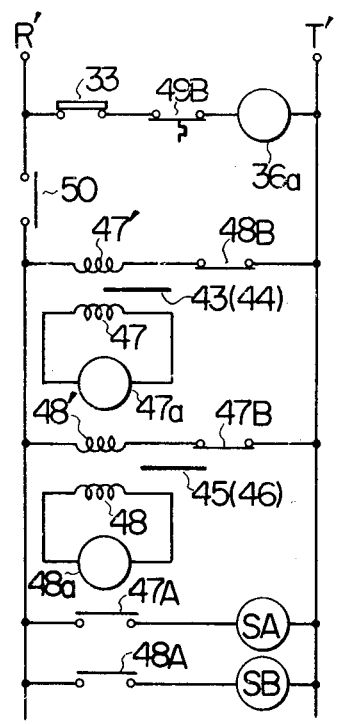
FIG. 2b is an electrical circuit diagram of the device shown in FIG. 1.

An embodiment of the present invention will be described with the aid of FIGS. 1, 2a and 2b. In FIG. 1, an elevator shaft 1 is provided with a guide rail 2. An elevator cage 3 is shifted up and down on the guide rail 2 by means of guide rollers 4. Openings 5 and 6 are automatic door ways for loading goods or for passengers getting on and off. A cylinder 7 has a plunger 8 as its mate and the latter is provided with a pulley 9 at its top. The cage 3 is fastened to the end of a rope 10 wound about the pulley 9 and thus the cage 3 moves as the plunger 8 shifts. The cylinder 7 communicates with a hydraulic, in particular, oil-pressure power unit 12 serving as a driving source of the hydraulic, in particular, pressure-oil elevator, through a main pipe line 11. The oil-pressure power unit 12 comprises an oil pump 16 driven by a motor 17 to conduct the oil from an oil tank 24 into the main pipe line 11 through a pipe line 19 and a check valve 15, a variable throttle valve 18 to control the amount of oil discharged from the pump 16 and supplied into the main pipe line 11, a pilot type check valve 20 to allow a part of oil in the main pipe line 11 to flow through a pipe line 22 by means of an electromagnetic valve 21, and a variable throttle valve 23 to control the amount of oil flowing through the pipe 22.

The constituents and the structure of the auxiliary power unit for correcting the landing level of the cage 3 are described in the following. An accumulator 32 contains oil whose pressure is kept higher than that of the oil in the main pipe line 11 and the oil in the accumulator 32 is poured, in accordance with the instruction of an electromagnetic valve 37, out into the main pipe line 11 through a throttle valve 38, a pipe line 39, a pilot operation check valve 40 and a pipe line 42. The electromagnetic valve 37 includes a block A connected by a solenoid SA to the pipe line 39 and a pilot pipe line 41 and a block B connected by a solenoid SB to the pipe line 39 and a pilot pipe line 41. The pressure of the oil in the accumulator 32 is electrically detected by a pressure switch 33 and the detected electric signal is sent through a line 34, a relay 36 and a line 35, to an auxiliary motor 26 to drive an auxiliary pump 25. The auxiliary pump 25, when the oil in the accumulator 32 has a pressure lower than a valve preset in the pressure switch 33, the oil in the tank 24 is supplied through a pipe line 27, a check valve 28 and a pipe line 31, for the accumulator 32. A relief valve 29 is actuated through a pilot pipe line 30 attached thereto.

Means for detecting the level difference between the floor of the building and the cage 3 comprises a pair of induction plates 43 and 45 and two pairs of induction coils 47, 47' and 48, 48', the induction coil 47 being mated with the coil 47' and the coil 48 with the coil 48'. If the coil 47' is energized with the induction plate 43 interposed between the coils 47' and 47, a current is induced in the coil 47. The same is true with the coils 48' and 48 and the plate 45. The coils are attached on the cage 3, separated by predetermined distances from one another. The induction plate 43 and 45 for the door way 6 are fixed on the wall of the shaft 1, insulated and separated by a distance L from each other. The distance L is so chosen as to be equal to or slightly larger than the height of each of the coils 47, 47', 48 and 48' and when the coils are located between the plates, the level of the cage floor coinsides with the landing floor of the door way 6. The same is true for the relation between the induction coils and the door way 5 and the plates 44 and 46.

Next, the circuit shown in FIGS. 2a and 2b will be described. Between an auxiliary motor 26 and the terminals T, S and R of a power source for the motor 26 is connected a thermal relay 49 having contacts 36A and contacts 49B. The relay 36 has a coil 36a connected in series with the pressure switch 33 and the contacts 49B of the thermal relay 49 and when a current flows through the coil 36a, the contacts 36A make circuit to actuate the auxiliary motor 26. If an excessive current flows through the thermal relay 49, the contacts 49B are broken to stop the auxiliary motor 26. A switch 50 is so designed as to be turned on when the cage 3 is brought to a halt. The induction coil 47' is connected in series with contacts 48B and disposed opposite to the induction coil 47 which is so connected with a relay having a coil 47a, make contacts 47A and break contacts 47B, as to form a closed circuit. The induction coil 48' is connected in series with the break contacts 47B and disposed opposite to the induction coil 48 which is so connected with a relay having a coil 48a, make contacts 48A and break contacts 48B actuated by the coil 48a, as to form a closed circuit. The make contacts 47A and 48A are connected in series respectively with the solenoids SA and SB of the electromagnetic valve 37.

Now, the operation of the level correcting device will be described through reference to FIGS. 1, 2a and 2b.

The accumulator 32 serving as a source of pressure oil in the level correcting device normally contains oil having a certain range of pressures. When the pressure of the oil in the accumulator 32 falls below a preset level, the pressure switch 33 is turned on to excite the coil 36a of the relay 36. Accordingly, the relay 36 is actuated to operate the motor 26 and thus the motor 26 drives the auxiliary pump 25 so that the oil discharged from the pump 25 is stored in the accumulator 32. When the pressure of the oil in the accumulator 32 reaches the set value, the pressure switch 33 is turned off to deenergize the coil 36a of the relay 36, so that the contacts 36A are opened to stop the motor 26. In this way, the pressure of the oil in the accumulator 32 is kept in a certain range.

OPERATION OF LEVEL CORRECTING DEVICE DURING ELEVATOR GOING UP

1. CASE where the cage 3 is lifted from the doorway 5 toward 6 and stopped below the doorway 6

In accordance with the instruction "stop" the switch 50 is turned on and a voltage is developed between the operating lines R' and T', so that a current flows through the induction coil 47'. Accordingly, the magnetic reluctance between the induction coil 47 and 47' because small owing to the induction plate inserted between the coils 47 and 47' and a current is induced in the coil 47 so that the coil of the relay 47a is excited to close the contacts 47A and to open the contacts 47B. Upon the closure of the contacts 47A, the solenoid SA of the electromagnetic valve 37 is energized to select the block A so that the oil contained in the accumulator 32 flows into the pressure oil cylinder 7 through the pipe line 39, the throttle valve 38, the pipe 42 and the main pipe 11. Consequently, the plunger 8 is pushed up to pull up the cage 3 hung by the rope 10. When the cage 3 reaches its stop position, the plate 43 recedes from the coil 47 and 47', that is, the coils 47, 47', 48 and 48' come into the interval L, so that the magnetic reluctance between the coils 47 and 47' increases to deenergize the coil of the relay 47a. Accordingly, the contacts 47A make circuit and the contacts 47B break circuit so that the solenoid SA of the valve 37 is deenergized to shift the valve 37 to its neutral position and to keep the cage 3 at the stop position.

2. CASE where the cage 3 is stopped above the doorway 6

When the cage stops beyond the stop position, a voltage is applied between the operating lines R' and T' since the switch 50 is turned on in accordance with the instruction stop. So, a current flows through the induction coil 48'. Since the induction plate 45 now lies between the coils 48' and 48, the magnetic reluctance between them is small so that a current flows through the induction coil 48 to excite the coil of the relay 48a. Accordingly, the contacts 48A make circuit while the contacts 48B break circuit. Upon closure of the contacts 48A, the solenoid SB of the valve 37 is energized to select the block B, so that the oil in the accumulator 32 flows into the pilot operation check valve 40 through the electromagnetic valve 37 and the pilot pipe line 41, to open the valve 40. Consequently, the oil in the pressure-oil cylinder 7 is evacuated into the tank 24 through the main pipe line 11, the pipe line 42, the pilot operation check valve 40, the pipe line 39, the throttle valve 38 and the electromagnetic valve 37. Therefore, the plunger 8 shifts down to lower the cage 3. When the cage 3 reaches the stop position, the induction plate 45 recedes from the induction coils 48 and 48', that is, the coils 48, 48', 47 and 47' come into the interval L, so that the magnetic reluctance between the coils 48 and 48' increases to deenergize the coil of the relay 48a. Accordingly, the contacts 48B are closed while the contacts 48A are opened. Upon opening of the contacts 48B, the solenoid SB of the electromagnetic valve 37 is deenergized to shift the valve 37 to its neutral position and to keep the cage at the stop position.

OPERATION OF LEVEL CORRECTING DEVICE DURING ELEVATOR GOING DOWN

1. CASE where the cage 3 is lowered from the doorway 6 toward the doorway 5 and stopped above the doorway 5

In accordance with the instruction stop, the switch 50 is actuated and turned on so that a voltage is applied between the operating lines R' and T'. Accordingly, a current flows through the induction coil 48' and since the magnetic reluctance between the induction coils 48' and 48 is small owing to the induction plate 46 inserted between the coils 48' and 48, a current is induced in the coil 48 so that the coil of the relay 48a is energized to open the break contacts 48B and to close the make contacts 48A. Consequently, the solenoid SB of the electromagnetic valve 37 is energized to select the block B so that the oil in the accumulator 32 flows into the pilot operating check valve 40 through the valve 37 and the pilot pipe line 41, to open the valve 40. As a result of this, the oil in the pressure coil cylinder 7 is poured out into the tank 24 through the main pipe line 11, the pipe line 42, the pilot operating check valve 40, the pipe line 39, the throttle valve 38 and the electromagnetic valve 37, so that the plunger 8 is shifted down to lower the cage 3. When the cage 3 reaches the stop position, the induction plate 46 recedes from the induction coil 48 and 48', so that magnetic reluctance between the coils 48 and 48' increases to deenergize the coil of the relay 48a. Accordingly, the contacts 48A are opened to deenergize the solenoid SB of the electromagnetic valve 37, so that the valve 37 is shifted to its neutral position to keep the cage at the proper stop position.

2. CASE where the cage is stopped below the doorway 5

In accordance with the instruction stop, the switch 50 is turned on so that a voltage is applied between the operating lines R' and T'. Accordingly, a current flows through the induction coil 47' and since the magnetic reluctance between the induction coils 47 and 47' is small owing to the induction plate 44 inserted between the coils 47 and 47', a current is induced in the coil 47 so that the coil of the relay 47a is energized to open the contacts 47B and to close the contacts 47A. Consequently, the solenoid SA of the electromagnetic valve 37 is energized to select the block A so that the oil in the accumulator 32 flows into the pressure-oil cylinder 7 through the pipe line 39, the throttle valve 38, the pipe line 42 and the main pipe line 11. Therefore, the plunger 8 is shifted up to lift up the cage hung by the rope 10. When the cage 3 reaches its proper stop position, the induction plate 44 recedes from the induction coils 47' and 47, so that the magnetic reluctance between the coils 47' and 47 increases to deenergize the coil of the relay 47a. Accordingly, the solenoid SA of the electromagnetic valve 37 is deenergized to shift the valve to its neutral position and to keep the cage 3 at the stop position.

OPERATION OF LEVEL CORRECTING DEVICE WHEN ELEVATOR CAGE IS SHIFTED UP OR DOWN WHILE RESTING

1. CASE where the cage 3 is shifted down below the proper landing level while resting If an additional load is put on the cage 3 resting at the doorway 5, the oil in the cylinder 7 is further compressed and the volume of the oil decreases. Accordingly, the plunger 8 is shifted down and if the shift distance exceeds an allowable limit, that is, the induction coils 47' and 47 get out of the interval L to have the induction plate therebetween, the coils 47' and 47 are magnetically coupled closely so that a current flows through the coil 47. Accordingly, the coil of the relay 47a is energized to close the contacts 47A and therefore the solenoid SA of the electromagnetic valve 37 is energized to select the block A. Consequently, the oil in the accumulator 32 is discharged into the cylinder 7 through the pipe line 39, the throttle valve 38, the pipe line 42 and the main pipe line 11. Therefore, the plunger 8 is shifted up to lift the cage 3 hung by the rope 10. When the cage 3 reaches the proper stop position, the magnetic reluctance between the coils 47' and 47 increases to deenergize the coil of the relay 47a so that the solenoid SA of the valve 37 is deenergized to shift the valve 37 to its neutral position. Therefore, the cage 3 is kept at the proper stop position.

2. CASE where the cage 3 is shifted up above the proper landing level while resting If the load decreases while the cage is resting, the cage 3 deviates from the proper stop position, i.e. landing level, since the oil in the cylinder 7 increases its volume due to expansion to shift up the plunger 8. Accordingly, the cage 3 fastened to the plunger 8 by the rope 10 is also shifted up. If the shift of the cage 3 exceeds an allowable limit, that is, the induction coils 48 and 48' get out of the interval L to have the induction plate 46 between them, the magnetic reluctance between them decreases to cause a current to flow through the coil 48 so that the coil of the relay 48a is energized to close the contacts 48A. Therefore, the solenoid SB of the electromagnetic valve 37 is energized to select the block B. Consequently, the oil in the accumulator 32 causes the pilot operation check valve 40 to open so that the oil in the cylinder 7 is poured out into the tank 24 through the main pipe line 11, the pipe line 42, the valve 40, the pipe line 39, the throttle valve 38 and the electromagnetic valve 37. As a result of this, the plunger 8 is shifted down to lower the cage 3. When the cage 3 reaches the proper stop position, the induction plate 46 recedes from the induction coils 48' and 48 so that the magnetic reluctance between the coils 48' and 48 increases to deenergize the coil of the relay 48a. Accordingly, the solenoid SB of the electromagnetic valve 37 is deenergized to shift the valve 37 to its neutral position so that the cage 3 is kept at the proper stop position. Further, according to the present invention, the shocks which may be otherwise generated when the electromagnetic valve 37 and the pilot operation check valve 40 are closed, can be eliminated due to the structure where the choke valve 38 is inserted in the pipe line 39 and therefore the operation of correcting the landing level is stabilized.

As described above by way of embodiment, according to the present invention, the landing accuracy of the elevator during the normal operation can be kept within a predetermined range and also the shift up and down of the cage due to the variation in load while it is resting can be corrected. Moreover, in this invention, there is no need for a large-capacity pump in the level control and some advantages can be enjoyed that the oil temperature is easily controlled, that the power comsumption is small and that the level correction can be performed very rapidly.

Figure 3:
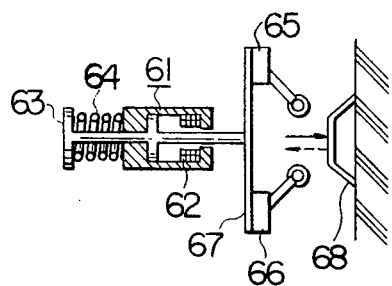
FIG. 3 shows a cross section of another embodiment of the level detecting device according to the present invention.
Figure 4:
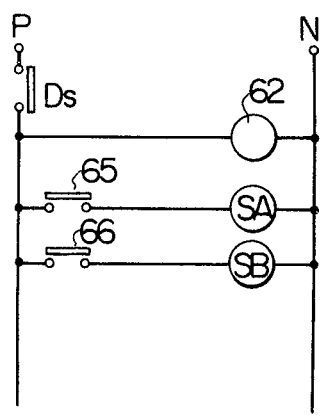
FIG. 4 is a part of an electrical circuit diagram of the level detecting device shown in FIG. 3.

FIGS. 3 and 4 show another embodiment of the device for detecting the landing level, used in the present invention. In FIG. 3, a magnet switch 61 is fixed to the cage 3 and has a coil 62 and a spring 64 which in cooperation shift the plunger 63 left and right. The plunger 63 is provided at its right end with a mounting plate 67 on which a pair of limit switches 65 and 66, separated by a predetermined distance from each other, is rigidly supported. Cams 68 to be engaged with the limit switches 65 and 66 are rigidly fixed in the elevator shaft 1, located properly near the doorways 5 and 6. The position of each cam is such that the limit switches 65 and 66 may not be engaged with the cam 68 if the plunger 63 is shifted right against the force of the spring 64 due to the actuation of the coil 62 upon the closure of a switch to be closed in accordance with the instruction of stopping the cage, such as the door switch $D_s$ as shown in FIG. 4, when the cage 3 is stopped at the proper landing floor.

With this arrangement, if the cage 3 is shifted down so that the limit switch 65 may be actuated, the solenoid SA of the electromagnetic valve 37 is energized while if the cage 3 is shifted up to actuate the limit switch 66, the solenoid SB is energized. And in accordance with the actuation of the solenoid SA or SB, the valve 37 is operated to shift up or down the cage 3 corresponding respectively to its level below or above the proper stop position.

According to this embodiment of the level detecting device, the cams and the limit switches are engaged with each other to correct the landing level only after the cage has once been stopped at or near the proper landing level so that the noises produced by the cams and the switches brought into contact with each other are hardly audible and that the chance of fault can be minimized.

Figure 5:
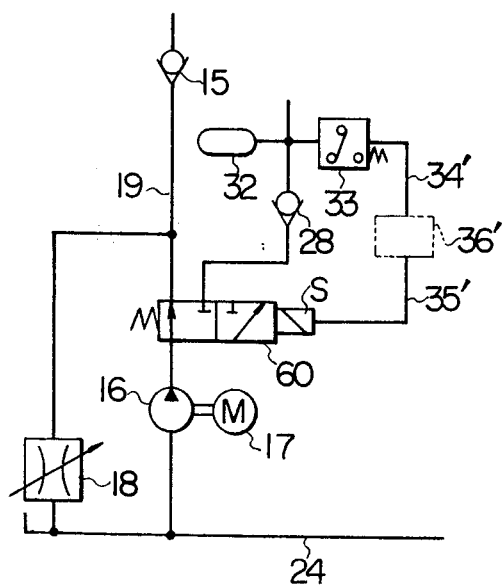
FIG. 5 is a block diagram of another embodiment of the driving source used in the level correcting device for a hydraulic elevator.
Figure 6:
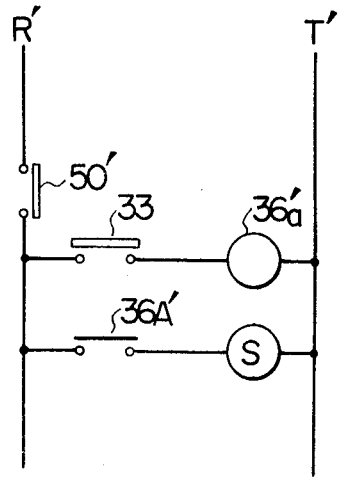
FIG. 6 is an electrical circuit diagram of the driving source shown in FIG. 5.

FIGS. 5 and 6 show another embodiment of the means, used in the present system shown in FIG. 1, for maintaining the pressure of the oil in the accumulator 32 above a predetermined value.

As seen in FIG. 5, the oil may be conducted from the main pump line 16 through the check valve 28 and an electromagnetic valve 60, to the accumulator 32. The valve 60 has a solenoid S which receives a signal from the pressure switch 33, through a line 34', a relay 36' and a line 35', to change over the blocks of the valve 60.

If a switch 50' shown in FIG. 6 is turned on when the cage 3 is stopped, the pressure switch 33 is closed in case where the pressure of the oil in the accumulator 32 is below the predetermined value. Accordingly, a voltage developed between lines R' and T' is applied to the coil 36a' of a relay 36' and the coil 36a' is energized to close the contacts 36A' of the relay 36' so that the solenoid S of the electromagnetic valve 60 is energized to select the right-hand block of the valve 60. The oil in the tank 24 is then conducted into the accumulator 32 through the main pump line 16, the valve 60 and the check valve 28 and the pressure of the oil in the accumulator 32 grows higher. When the pressure exceeds a predetermined value, the pressure switch 33 is opened so that the solenoid S of the valve 60 is deenergized through the deenergization of the coil 36a' of the relay 36'. Consequently, the initial state of the electromagnetic valve 60 is restored to stop the flow of the oil into the accumulator 32.

In this way, the pressure of the oil in the accumulator 32 can be kept at a constant value. In this embodiment, the regulation of the oil pressure is performed by the pump used for driving the elevator cage and therefore the reduction of the production cost can be expected.

What we claim is:

1. A device for correcting the level of an elevator cage in a hydraulic elevator system provided with a cylinder set including a plunger and a cylinder, said cage being driven in the shaft corresponding to the motion of said cylinder set by controlling the hydraulic fluid oil in said cylinder through a main power unit, wherein said device comprises detecting means to electrically detect the relative position of said cage to a landing floor, said detecting means including first means provided on said cage and second means provided in said shaft, said first and second means being associated with each other to detect said relative position and being so arranged that said first and second means are spaced from one another in a direction transverse to the running direction of said cage whenever said cage is being driven by said main power unit, said first and second means functioning as means for detecting positional deviations of the cage from respective predetermined stop positions in response to an external cage-stop indicating signal; and an auxiliary power unit to control, in accordance with an electrical signal derived from said detecting means, said hydraulic fluid in said cylinder so that said cage is stopped at respective predetermined stop positions, wherein said auxiliary power unit includes an accumulator containing hydraulic fluid whose pressure is higher than that of the fluid in said cylinder and means, provided in a fluid path between said accumulator and said cylinder, to conduct the hydraulic fluid in said accumulator into said cylinder or to discharge the hydraulic fluid from said cylinder in accordance with said electrical signal derived from said detecting means.

2. A device as claimed in Claim 1, wherein said auxiliary power unit includes electromagnetic valve means provided in the fluid path between said accumulator and said cylinder, and check valve means provided in the fluid path between said electromagnetic valve means and said cylinder, said electromagnetic valve means controlling the hydraulic fluid in said cylinder in accordance with said electrical signal from said detecting means.

3. A device as claimed in claim 2, wherein said detecting means includes switching means to control said electromagnetic means and actuator means to actuate said switching means.

4. A device as claimed in claim 3, wherein said actuator means includes cams rigidly fixed to the inner wall of said shaft and located corresponding to respective landing floors, and said switching means includes two limit switches fixed to said cage and separated vertically by a predetermined distance from each other, said limit switches being engaged with said cams only when said cage is resting.

5. A device as claimed in claim 2, wherein throttle valve means is provided in the fluid path between said check valve means and said electromagnetic valve means.

6. A device as claimed in claim 5, wherein said accumulator communicates with means for detecting the pressure of the hydraulic fluid in said accumulator and an auxiliary pump operable in response to said means for detecting the pressure when said detected pressure of the hydraulic fluid is lower than a predetermined value.

7. A device as claimed in claim 5, wherein said accumulator communicates with a main pump through check valve means and electromagnetic valve means so that said electromagnetic valve controls the hydraulic fluid in said accumulator through a pressure switch associated with said accumulator to thereby keep the pressure of said hydraulic fluid at a predetermined value.

8. A device as claimed in claim 1, wherein said detecting means includes a plurality of induction coils and a plurality of induction plates associated with said coils.

9. A device as claimed in claim 8, wherein one of each pair of said induction coils is connected with a power source through a switch while the other is connected with relay means to control said electromagnetic valve means.

10. A device as claimed in claim 9, wherein the number of the pairs of said induction coils are two and said associated induction plates are provided in said shaft separately from each other by a predetermined distance vertically.

11. A device as claimed in claim 1, wherein one of said first and second means includes induction coil means and the other of said first and second means includes induction plate means, said induction coil means and induction plate means being transversely spaced from one another for all positions of said cage.

12. A device according to claim 1, wherein one of said first and second means is a cam member and the other of said first and second means includes cam switch means engageable with said cam member, said cam switch means being movable in response to said external cage stop indicating signal from an inoperative position transversely spaced from the cam member to an operative position engageable with the cam member.

* * * * *